Patented June 2, 1953

2,640,810

UNITED STATES PATENT OFFICE 2,640,810

TREATMENT OF WELLS

Paul H. Cardwell and Charles L. Lunsford, Tulsa, Okla., assignors to The Dow Chemical Company, Midland, Mich., a corporation of Delaware No Drawing. Application September 14, 1950, Serial No. 184,899

5 Claims. (Cl. 252—8.55)

The invention relates to the treatment of earth wells particularly those drilled for oil or gas. It more particularly concerns the acid treatment of wells drilled into calcareous formations.

Acidizing wells in calcareous earth formations to increase productivity by injecting into the producing formation aqueous hydrochloric acid is in very general use in oil and gas fields, the wells in which respond favorably to such treatments. In some oil and gas fields, the conventional treatment of the wells therein with hydrochloric acid oftentimes either fails to produce an increase in production or may actually cause a reduction in output. As a result of investigating the causes of such anomalous results, we have discovered that in calcareous formations in which wells fail to respond favorably to the acidizing treatment there is present within the formation siliceous matter which swells and blocks the interstices of the formation to fluid flow when the acid becomes sufficiently spent in attacking the calcareous matter. The hydrochloric acid conventionally used in acidizing wells contains from about 5 to 20 per cent of HCl, 15 per cent being most generally used. In the presence of limestone or dolomite, the acid becomes spent and the pH of the spent solution will reach about 4 or 5. At these pH values, silicates such as illite, andesine, and bentonite, if present, will swell, clogging the interstices of the calcareous formation otherwise enlarged by the acidization.

We have now discovered that by including in the acid solution, used to acidize the calcareous formation, a buffering agent of formic acid or salt thereof, e. g. sodium or potassium formate, the swelling of silicates, if present, which occurs in the conventional acidizing operation, is obviated and improved results are had. Accordingly, the invention then consists of the improved acidizing method in which formic acid or at least one of its salts are included in the acidizing solution herein fully described and particularly pointed out in the claims.

In carrying out the invention, ordinary commercial hydrochloric acid may be used having a suitable HCl content, such as 5 to 25 per cent by weight, although 15 per cent of HCl by weight is usually preferred. In conventional acidizing practice, one or more of the following types of agents are oftentimes included in the acid solution where their use is desirable: wetting agents, penetrants, surface tension reducers, intensifiers, corrosion inhibitors. In accordance with the invention, there is included in the hydrochloric acid solution (which may also contain any of the foregoing types of agents) formic acid or one of its salts, preferably sodium formate. A sufficient amount is used to prevent the pH of the acid solution from rising above about 4 and preferably not above about 3 as it becomes spent in attacking the calcareous material of the earth formation. Effective amounts are from about 2.5 to 15 per cent of the formic acid or its salts by weight, a preferred amount is about 3 per cent by weight.

The hydrochloric acid solution containing the formic acid or formic acid salt as above indicated with or without one or more of the aforesaid types of agents is introduced into the well and thence into the earth formation in any convenient manner as understood in the acidizing art. After the injection of the acid solution into the earth, the well may be closed in to allow time for the acid to attack the formation but the shut-in time should not exceed 3 or 4 hours. After the acid has attacked the formation, the spent acid may be withdrawn as by pumping, bailing or allowing the well to flow, if it will.

As illustrative of the effect of hydrochloric acid in swelling silicates present in calcareous rock as the hydrochloric acid becomes spent in attacking the rock, tests were performed in which the common silicates, which are found in the calcareous formations and swell in the spent acid, were subjected to the swelling action of hydrochloric acid alone spent to various pH values. The results of the tests are set forth in the accompanying table.

TABLE I

Swelling of silicates exposed to spent hydrochloric acid solutions

| pH of Acid Solution | Volume in ml. of 1 Gram of Silicate After Exposure to the Acid Solution | | | |
|---|---|---|---|---|
| | Illite | Andesine | Serpentine | Bentonite |
| 1 | 1.85 | 1.00 | ---------- | 4.5 |
| 2 | 1.80 | 0.95 | 1.50 | 4.2 |
| 3 | 1.50 | 0.90 | 1.30 | 3.4 |
| 4 | 3.40 | >5 | 1.40 | >5 |
| 5 | 4.90 | >5 | >5 | >5 |

In the foregoing tests, it appears that as the pH of the acid increases beyond about 3 or 4 there is a sharp increase in the volume of the silicates exposed to the acid solution. In the case of illite, andesine, and bentonite, swelling begins markedly as the pH of the acid rises above about 3; in the case of serpentine marked swelling does not occur until the pH of the acid exceeds about 4.

By including formic acid or one of the formates in the hydrochloric acid solution in accordance with the invention, the pH of the acid does not rise above about 3 as it becomes spent in attacking calcareous formations containing silicates and swelling is thus obviated.

For example, the pH of 15 per cent HCl solution containing 3 per cent of either formic acid or sodium formate expended on dolomite reaches only 2.85 or 2.95, respectively, (while in the absence of the buffer, the pH of the same acid solution reaches 4 or 5), and the silicates which swell in the unbuffered spent acid to as much as five times their original volume as shown in Table I do not swell beyond the volumes shown in Table II.

TABLE II

*Swelling of silicates exposed to spent 15 per cent hydrochloric acid solution containing formic acid or sodium formate*

| Material Added to 15% HCl | pH of Spent Acid Solution | Volume in ml. of 1 Gram of Silicate Exposed to Acid Solution | | | |
|---|---|---|---|---|---|
| | | Illite | Andesine | Serpentine | Bentonite |
| 3% Formic Acid | 2.85 | 1.60 | 0.92 | 1.35 | 3.5 |
| 3% Sodium Formate | 2.95 | 1.50 | 0.90 | 1.30 | 3.4 |

We claim:
1. In acidizing with aqueous hydrochloric acid a calcareous formation containing a silicate capable of swelling as the acid becomes spent on attacking the calcareous matter, the improved acidizing method which consists in including in the acid solution a buffering agent selected from the group consisting of formic acid and its salts.
2. The method according to claim 1 in which the hydrochloric acid contains 5 to 25 per cent of HCl and the buffering agent is present in amount between 2.5 and 15 per cent by weight.
3. The method according to claim 2 in which the buffering agent is formic acid.
4. The method according to claim 2 in which the buffering agent is sodium formate.
5. The method according to claim 2 in which the buffering agent is potassium formate.

PAUL H. CARDWELL.
CHARLES L. LUNSFORD.

References Cited in the file of this patent

UNITED STATES PATENTS

| Number | Name | Date |
|---|---|---|
| 1,877,504 | Grebe et al. | Sept. 13, 1932 |
| 2,024,718 | Chamberlain | Dec. 17, 1935 |
| 2,045,899 | Davis | June 30, 1936 |
| 2,234,790 | Zacher | Mar. 11, 1941 |
| 2,238,671 | Woodhouse | Apr. 15, 1941 |
| 2,301,875 | Holmes | Nov. 10, 1942 |